(12) United States Patent
Shimizu (10) Patent No.: US 11,864,489 B2
(45) Date of Patent: Jan. 9, 2024

(54) SHEARING MECHANISM

(71) Applicant: YAMABIKO CORPORATION, Tokyo (JP)

(72) Inventor: Kunio Shimizu, Ohme (JP)

(73) Assignee: YAMABIKO CORPORATION

( * ) Notice: Subject to any disclaimer, the term of this patent is extended or adjusted under 35 U.S.C. 154(b) by 280 days.

(21) Appl. No.: 17/514,021

(22) Filed: Oct. 29, 2021

(65) Prior Publication Data

US 2022/0210969 A1 Jul. 7, 2022

(30) Foreign Application Priority Data

Jan. 5, 2021 (JP) ................. 2021-000387

(51) Int. Cl.
*A01D 34/135* (2006.01)
*A01D 34/14* (2006.01)
*A01D 34/32* (2006.01)

(52) U.S. Cl.
CPC ......... *A01D 34/135* (2013.01); *A01D 34/145* (2013.01); *A01D 34/32* (2013.01)

(58) Field of Classification Search
CPC ..... A01D 34/135; A01D 34/145; A01D 34/32
See application file for complete search history.

(56) References Cited

U.S. PATENT DOCUMENTS

| | | | | |
|---|---|---|---|---|
| 3,083,457 A * | 4/1963 | Ottosen | .............. | A01G 3/053 30/216 |
| 3,699,655 A * | 10/1972 | Taylor | .............. | A01G 3/053 30/216 |
| 5,271,154 A * | 12/1993 | Ohkanda | .............. | B23D 49/006 30/216 |
| 5,373,641 A * | 12/1994 | Ohkanda | .............. | A01G 3/053 30/216 |
| 5,531,027 A * | 7/1996 | Martinez | .............. | A01G 3/053 30/216 |
| 5,689,887 A * | 11/1997 | Heywood | .............. | A01G 3/053 30/220 |
| 6,598,299 B2 * | 7/2003 | Stark | .............. | A01G 3/053 30/220 |

(Continued)

FOREIGN PATENT DOCUMENTS

| | | |
|---|---|---|
| IT | 20090085 | 10/2010 |
| JP | S53-003171 Y2 | 1/1978 |

(Continued)

OTHER PUBLICATIONS

European Search Report issued for the corresponding European Patent Application No. 21206590.8; dated Apr. 25, 2022 (total 7 pages).

*Primary Examiner* — Sean M Michalski
(74) *Attorney, Agent, or Firm* — Harness, Dickey & Pierce, P.L.C.

(57) ABSTRACT

A shearing mechanism is provided including a pair of blade units comprising shearing blades respectively; and a motion mechanism configured to move at least one of the pair of blade units along a predetermined trajectory in such a manner that a velocity thereof does not become zero while maintaining a relative posture of the pair of blade units, wherein the pair of blade units are configured to cut an object by overlapping the shearing blades of each other during the motion.

8 Claims, 10 Drawing Sheets

(56) References Cited

U.S. PATENT DOCUMENTS

| | | | | |
|---|---|---|---|---|
| 6,698,177 | B1 * | 3/2004 | Akehi | B21D 53/28 |
| | | | | 74/567 |
| 7,258,205 | B2 * | 8/2007 | Berti | A01G 3/053 |
| | | | | 74/529 |
| 9,101,094 | B2 * | 8/2015 | Kato | A01G 3/053 |
| 9,603,311 | B2 * | 3/2017 | Wang | A01G 3/053 |
| 9,736,991 | B2 * | 8/2017 | Hanada | A01G 3/053 |
| 9,961,839 | B2 * | 5/2018 | Stones | A01G 3/053 |
| 2013/0160304 | A1 * | 6/2013 | Tate | B27B 17/0008 |
| | | | | 30/277.4 |
| 2016/0360708 | A1 | 12/2016 | Hanada et al. | |
| 2020/0406415 | A1 * | 12/2020 | Shimizu | A01D 34/82 |

FOREIGN PATENT DOCUMENTS

| | | |
|---|---|---|
| JP | 2004-008069 A | 1/2004 |
| JP | 2015-104362 A | 6/2015 |
| JP | 2015-116131 A | 6/2015 |

\* cited by examiner

SHEARING MECHANISM

CROSS REFERENCE TO RELATED APPLICATIONS

The present application claims priority under 35 U.S.C. § 119 to Japanese Patent Application No. 2021-000387, filed Jan. 5, 2021, the contents of which are incorporated herein by reference in their entirety.

BACKGROUND

Technical Field

The present invention relates to a shearing mechanism.

Background Art

Rotary blades used in lawn mowers such as brush cutters may cause safety concerns because they scatter stones and other hard objects (foreign objects) during rotation.

Japanese Utility Model Gazette No. S53-003171 discloses a technique for a lawn mower that uses two blades moving back and forth from side to side like the blades of a pair of clippers to reduce the number of flying objects.

However, in the technology disclosed in Japanese Utility Model Gazette No. S53-003171, a blade is chipped or deformed by biting hard objects such as stones (foreign objects) since it is pruned by upper and lower blades. Furthermore, reciprocating motion places a heavy load on mechanical parts.

SUMMARY OF THE INVENTION

According to one aspect of the present invention, there is provided a shearing mechanism. The shearing mechanism comprises a pair of blade units comprising shearing blades respectively; and a motion mechanism configured to move at least one of the pair of blade units along a predetermined trajectory in such a manner that a velocity thereof does not become zero while maintaining a relative posture of the pair of blade units, wherein the pair of blade units are configured to cut an object by overlapping the shearing blades of each other during the motion.

According to such a shearing mechanism, since velocity change of the shearing blade is small, the load on the mechanical parts is reduced. In addition, vibration noise is less likely to occur. Moreover, since kinetic energy does not become zero, the cutting efficiency is improved.

DETAILED DESCRIPTION OF EMBODIMENTS

Hereinafter, embodiments of the present invention will be described with reference to the drawings. Various features described in the embodiment below can be combined with each other.

1. Overall Configuration

Figure 1:
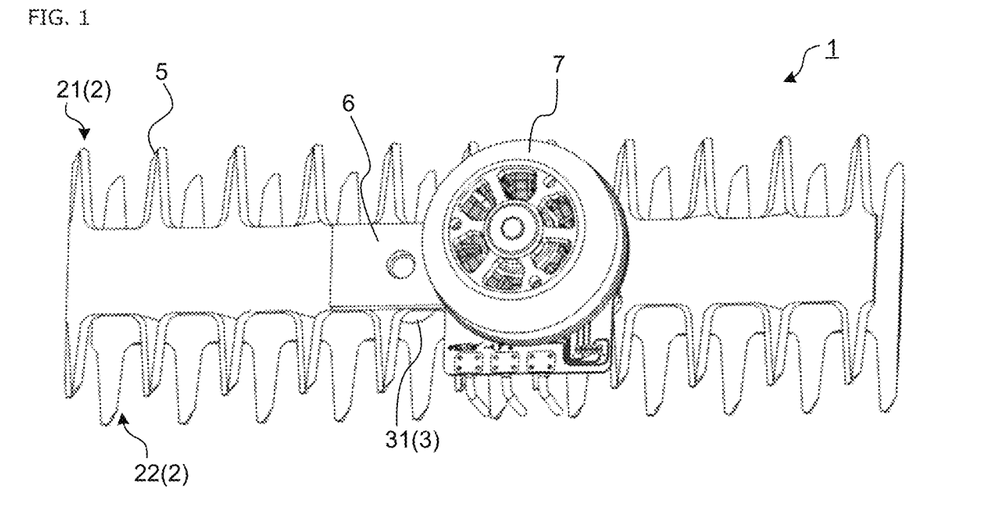
FIG. 1 is a schematic perspective view showing a shearing mechanism.

In chapter 1, a shearing mechanism according to the present embodiment will be described. FIG. 1 is a schematic perspective view showing the shearing mechanism.

1.1 Shearing Mechanism 1

Figure 2:
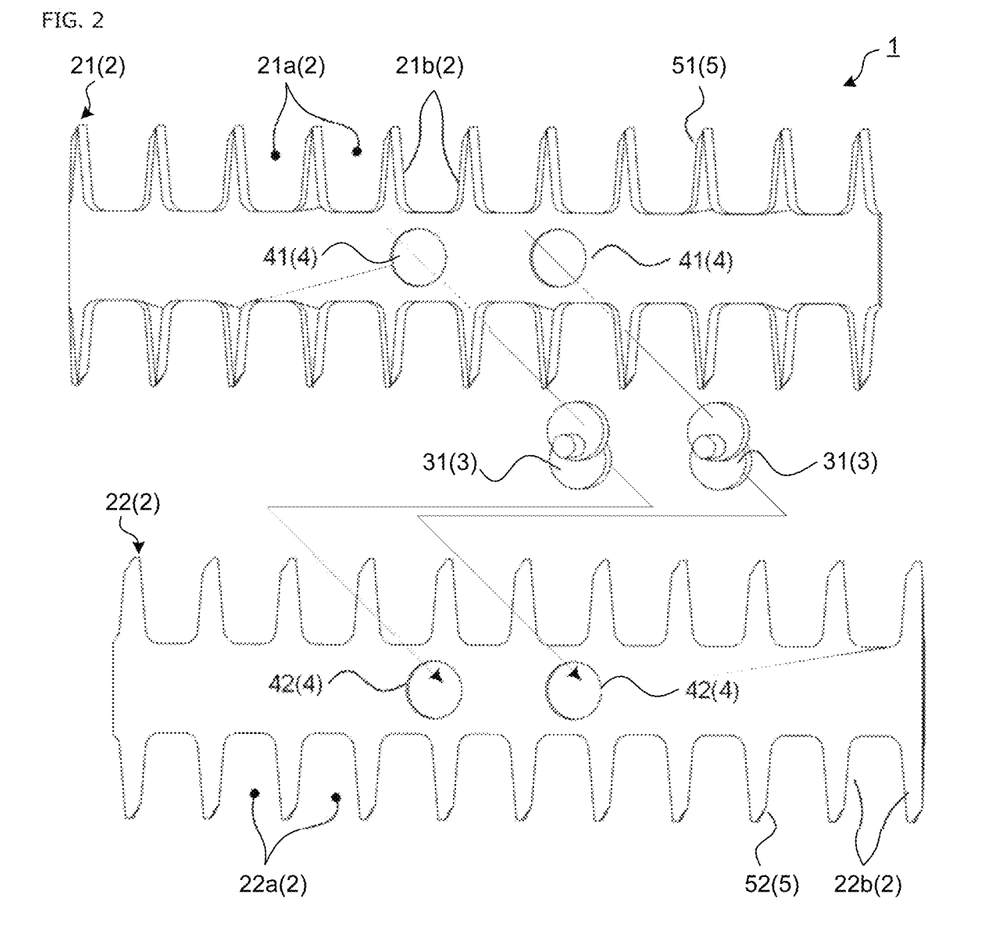
FIG. 2 is a schematic perspective view showing a configuration of a blade unit 2 and a motion mechanism 3 of a shearing mechanism 1.
Figure 3:
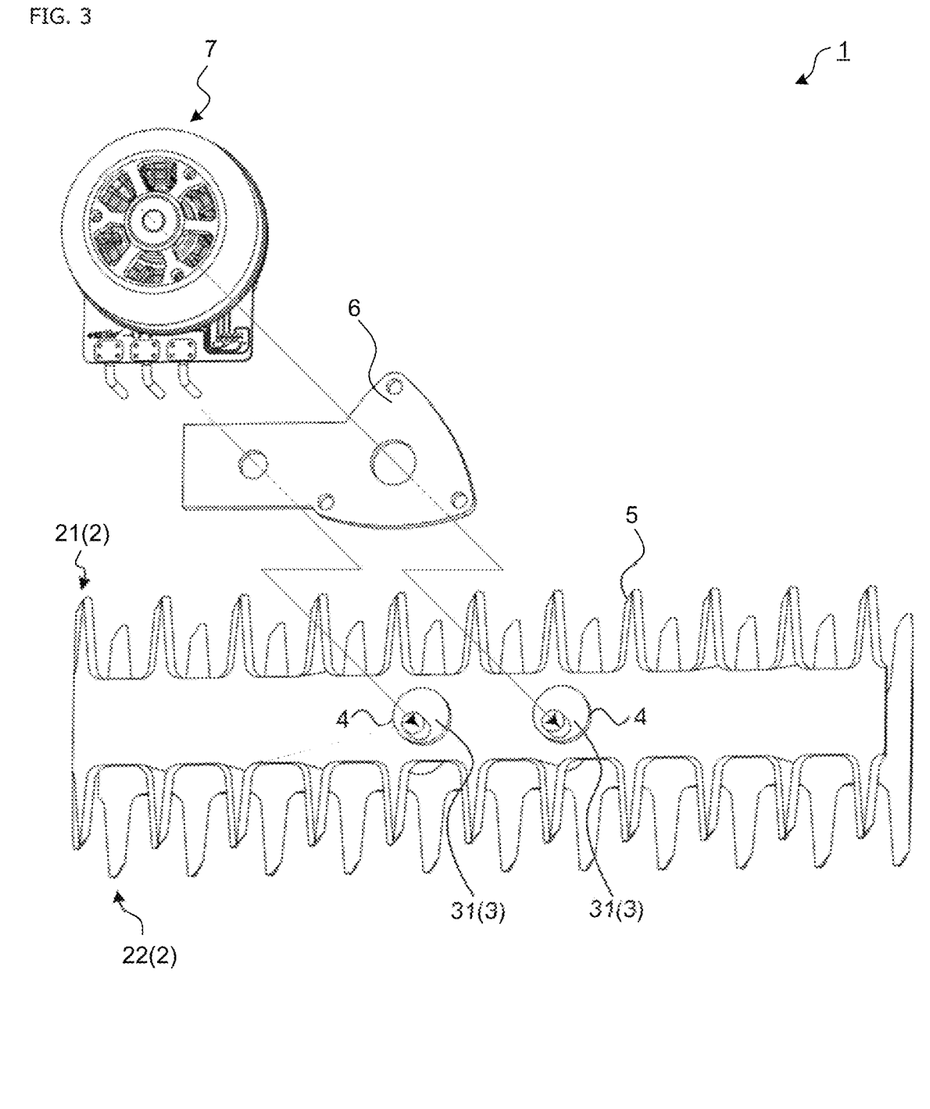
FIG. 3 is a schematic perspective view showing a configuration of the motion mechanism 3, an engagement portion 4, a base 6, and a motor 7 of the shearing mechanism 1.

The shearing mechanism 1 comprises a pair of blade units 2 and a motion mechanism 3, and is a mechanism for cutting an object by exerting a force in a direction parallel to a surface with respect to any surface inside the object. As shown in FIG. 1, the shearing mechanism 1 comprises the pair of blade units 2, the motion mechanism 3, an engagement portion 4, an extrusion surface 5, a base 6, and a motor 7. FIG. 2 is a schematic perspective view showing a configuration of the blade unit 2 and the motion mechanism 3 of the shearing mechanism 1. FIG. 3 is a schematic perspective view showing a configuration of the motion mechanism 3, the engagement portion 4, the base 6, and the motor 7 of the shearing mechanism 1.

1.2 Blade Unit 2

Figure 4:
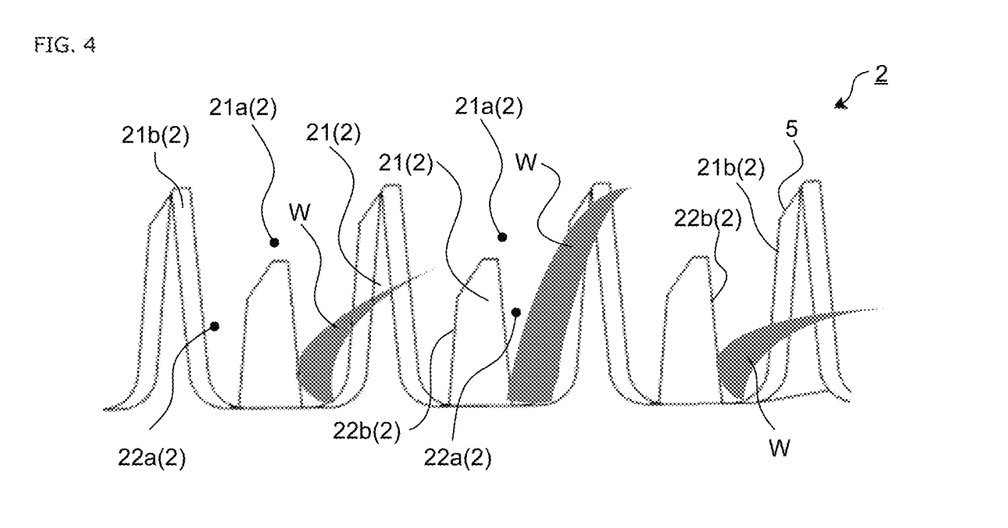
FIG. 4 is a view showing a state in which the shearing mechanism 1 is shearing an object W to be cut.

The pair of blade units 2 comprise shearing blades respectively, specifically, a first shearing blade 21 and a second shearing blade 22. The first shearing blade 21 and the second shearing blade 22 are in a shape of comb-teeth and have at least one or more recess. The first shearing blade 21 and the second shearing blade 22 are configured to be overlapped and brought into contact with each other, and slide with each other while maintaining the state. FIG. 4 is a view showing a state in which the shearing mechanism is shearing an object W to be cut. As shown in FIG. 4, the object W sandwiched between a recess 21a of the first shearing blade 21 and a recess 22a of the second shearing blade 22 is cut by receiving a shearing force in a parallel direction due to the sliding of the first shearing blade 21 and the second shearing blade 22. Specifically, the object W is cut by a blade portion 21b of the first shearing blade 21 and a blade portion 22b of the second shearing blade 22 applying the shearing force horizontally to an axis direction of the object W. Therefore, areas of the end portions of the blade portion 21b and the blade portion 22b become small, and the configuration is designed to increase the shearing force by increasing the pressure per unit area. In other words, the cutting surfaces of the blade portion 21b and the blade portion 22b have a sharp blade shape. A blade angle or a cross-sectional shape of the blade portion 21b and the blade portion 22b are not limited, as they are determined by a machine comprising the shearing mechanism 1 or the object W.

The first shearing blade 21 and the second shearing blade 22 are in the shape of comb-teeth, respectively, and have the blade portion 21*b* and the blade portion 22*b* on both sides of the comb-teeth. This is because the first shearing blade 21 and the second shearing blade 22 slide with each other in a circular motion to improve the cutting efficiency. Therefore, it is preferable to have such a configuration.

In FIGS. 1, 2 and 3, although the first shearing blade 21 and the second shearing blade 22 have the blade portion 21*b* and the blade portion 22*b* which are cutting surfaces on both sides in a longitudinal direction, the cutting surface may be provided on only one side. Further, material of the first shearing blade 21 and the second shearing blade 22 can be a metal such as stainless steel, carbon steel, alloy steel, tool steel, powder metallurgical steel, composite steel, titanium alloy, or the like, and can be carbon fiber or plastic as well. The material is not limited as long as the first shearing blade 21 and the second shearing blade 22 are capable of cutting the object W. Although the first shearing blade 21 and the second shearing blade 22 each have the recess 21*a* and the recess 22*a* in a shape of comb-teeth, the number of the comb-teeth, depth, width, and other specifications of the recess are not limited. Furthermore, thickness of the first shearing blade 21 and the second shearing blade 22 is not limited as well.

1.3 Motion Mechanism 3

The motion mechanism 3 moves at least one of the pair of blade units 2 along a predetermined trajectory in such a manner that a velocity thereof does not become zero while maintaining a relative posture of the pair of blade units 2. By having such a motion mechanism 3 in the shearing mechanism 1, the pair of blade units 2 are configured to cut the object W by overlapping the shearing blades, the first shearing blade 21 and the second shearing blade 22, of each other during the motion. Preferably, the predetermined trajectory is a circular trajectory, and the motion is a circular motion. More preferably, the motion mechanism 3 moves both of the pair of blade units 2 along the respective predetermined trajectories in such a manner that the velocity thereof does not become zero.

The motion mechanism 3 maintains the relative posture of the first shearing blade 21 and the second shearing blade 22, which are the shearing blades of each other of the blade units 2, and the velocity thereof does not become zero, thereby reduces the load on a mechanical part configuring the shearing mechanism 1. In addition, the occurrence of vibration noise can be suppressed. Moreover, since kinetic energy does not become zero, the motion mechanism 3 can improve the cutting efficiency.

Preferably, the motion mechanism 3 engages with the pair of blade units 2 via the engagement portion 4, and one part of the engagement portion 4 relatively performs the circular motion around other part of the engagement portion 4. In other words, the motion mechanism 3 generates a relative circular motion by eccentricing the rotational axes of the first shearing blade 21 and the second shearing blade 22 with each other around the engagement portion 4. As a mechanism for this purpose, the motion mechanism 3 includes a plurality of eccentric cams 31 to be described later. As an example, the eccentric cam 31 may be a parallel crank mechanism (not shown). The motion mechanism 3 may independently control and operate the first shearing blade 21 and the second shearing blade 22, respectively, and may allow them to move in the relative circular motion. Hereinafter, the motion mechanism 3 will be described as the eccentric cam 31 in the embodiment.

As shown in FIG. 2, when the motion mechanism 3 is the eccentric cam 31, the motion mechanism 3 includes two eccentric cams 31. Each of the eccentric cams 31 has two eccentric axes corresponding to the rotational axis. One of the two eccentric axes is engaged with the first shearing blade 21 via an engagement portion 41, and the other is engaged with the second shearing blade 22 via an engagement portion 42. In addition, the rotational axis of one of the two eccentric cams 31 is bonded to the motor 7, which will be described later. That is, the eccentric cam 31 bonded to the motor 7 is a driving axis, and the other eccentric cam 31 is the driven axis that rotates accordingly. By such a motion mechanism 3, the predetermined trajectory is realized.

1.4 Engagement Portion 4

The first shearing blade 21 and the second shearing blade 22 have a plurality of through holes that are the engagement portions 4. The position of the through holes, which are the engagement portions 4, is not limited as long as they are inside the first shearing blade 21 and the second shearing blade 22. Through the through holes, the first shearing blade 21 is engaged with the eccentric cam 31 via the engagement portion 41, and the second shearing blade 22 is engaged with the eccentric cam 31 via the engagement portion 42. As shown in FIG. 2, since there are two eccentric cams 31, the first shearing blade 21 and the second shearing blade 22 of the engaged pair of blade units 2 are in constrained motion while contacting with each other. As a result, the two shearing blades can maintain the relative posture to each other.

1.5 Extrusion Surface 5

Figure 5:
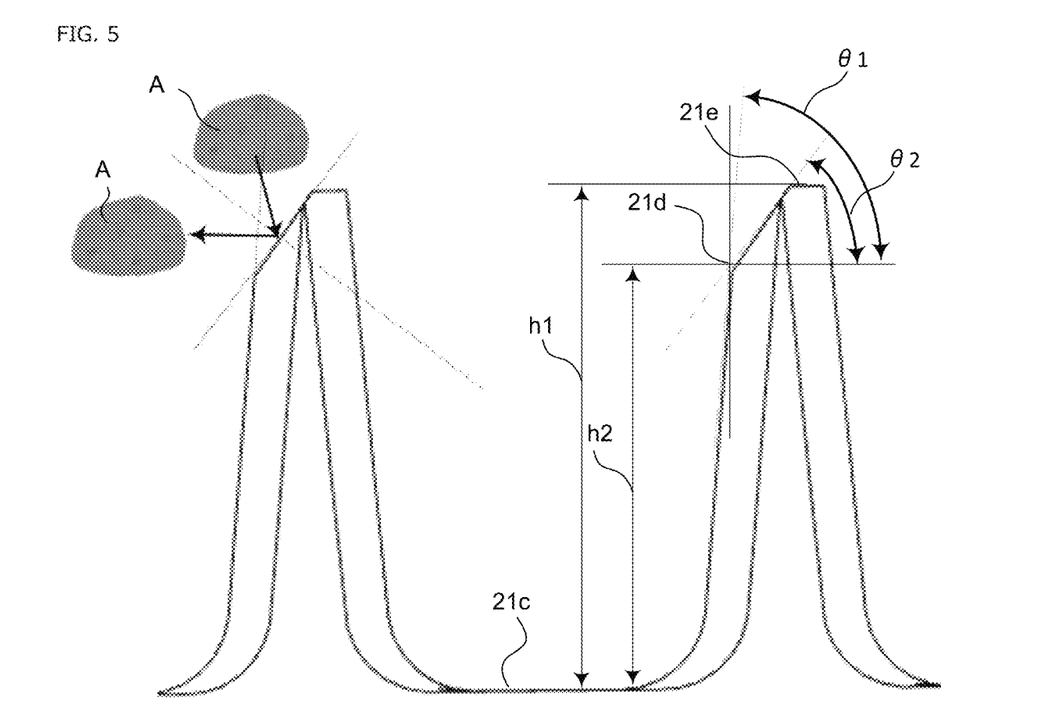
FIG. 5 is a schematic view showing an extrusion surface 5 of each shearing blade of the blade unit 2 of the shearing mechanism 1.

FIG. 5 is a schematic view showing the extrusion surface 5 of each shearing blade of the blade unit 2 of the shearing mechanism 1. The shearing mechanism 1 is mounted on, for instance, a lawn mower that cuts a lawn or a grass. Therefore, since a cutting work is performed outdoors, a foreign object A such as a stone or a metal piece may enter between the recess 21*a* and the recess 22*a* of the shearing blades during cutting. As a result, the foreign object A may cause damage to the first shearing blade 21 and the second shearing blade 22. To prevent the foreign object A from entering the recess 21*a* and the recess 22*a* as much as possible, the shearing blade with respect to at least one of the blade units 2 comprises the extrusion surface 5 at an end of the shearing blade. That is, the first shearing blade 21 may comprise an extrusion surface 51 and the second shearing blade 22 may comprise an extrusion surface 52, or only one thereof may comprise the extrusion surface 5. To prevent the foreign object A from entering the recess 21*a* and the recess 22*a* as much as possible in this way, the end portions of the shearing blades are provided with a predetermined angle in such a manner that the foreign object A is extruded at the ends of the first shearing blade 21 and the second shearing blade 22. Therefore, the extrusion surface 5 is configured to extrude the foreign object A when the shearing blades are not overlapping. In the next chapter, the extrusion surface 5 will be described in detail.

1.6 Base 6

As shown in FIG. 3, the base 6 is installed to an upper surface of the eccentric cam 31, has a plurality of through holes in such a manner that the eccentric cam 31 can rotate freely, and engages with the eccentric cam 31. One of the plurality of through holes is configured to bond the rotational axis of the eccentric cam 31 to a rotational axis of the motor 7 described below.

Figure 6:
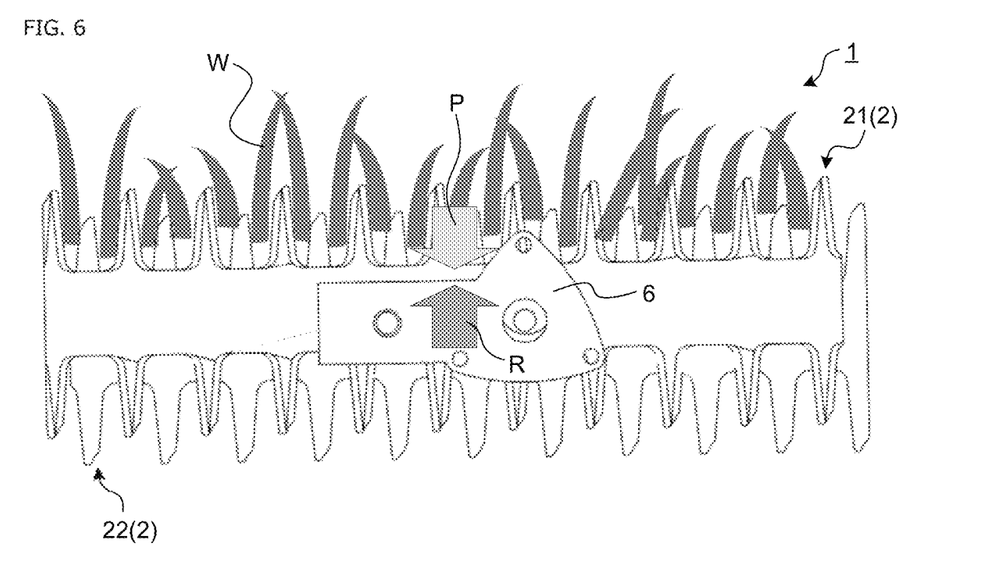
FIG. 6 is a schematic view showing a state in which the blade unit 2 is cutting the object W.

FIG. 6 is a schematic view showing a state in which the blade unit 2 is cutting the object W. In the shearing mechanism 1, the first shearing blade 21 and the second shearing blade 22 that are the mutual shearing blades of the blade units 2 perform the circular motion while maintaining the relative posture to each other. Thus, while cutting the lawn or the grass, the shearing mechanism 1 receives a resistance force P in the horizontal direction from the lawn or the grass rooted in the ground. By receiving such a resistance force P, the first shearing blade 21 and the second shearing blade 22 are unable to maintain the relative posture to each other. Therefore, the plurality of engagement portions 4 engaging the first shearing blade 21 and the second shearing blade 22 need to be fixed by the base 6. By having the base 6 in the shearing mechanism 1, the resistance force P from the lawn or grass as an external force and a reaction force R of the base 6 are balanced, and the first shearing blade 21 and the second shearing blade 22 can maintain the relative posture to each other.

1.7 Motor 7

The motor 7 is configured to drive the motion mechanism 3. Preferably, the rotational axis of the eccentric cam 31 engaged with the first shearing blade 21 or the second shearing blade 22 is configured to directly accept a power of the motor 7. In other words, the shearing mechanism 1 is driven by a direct drive motor. By adopting a direct drive without using a reduction mechanism, loss due to wear of a reduction gear or the like can be reduced, resulting in high cutting efficiency. In addition, the absence of contact with the reduction gear or the like reduces the number of parts that cause vibration, thereby mechanical noise of the shearing mechanism 1 can be reduced. Furthermore, the absence of the reduction gear or the like can contribute to the downsizing of a machine configuring the shearing mechanism 1.

2. Object W and Foreign Object A

In chapter 2, the object W to be cut by the shearing mechanism 1 and the foreign object A to be avoided from being cut will be described. The shearing mechanism 1 is mounted on, for instance, a lawn mower that cuts a lawn or a grass. The object W to be cut by the lawn mower is an object existing on a lawn land such as a grass, a weed, or a wood chip. According to a machine on which the shearing mechanism 1 is mounted, the object W may be a paper or a hair. A material of the object W is not limited as long as it can be cut by the shearing blade configuring the blade unit 2.

The foreign object A is a pebble or a metal piece when the shearing mechanism 1 is mounted on the lawn mower. Such a foreign object A exists even in a place where the lawn is to be mowed, such as a park or a golf course. If the shearing mechanism 1 is a mechanism in which the shearing blade reciprocates in one direction like a clipper, the load on the shearing blade is large because the shearing blade receives a force from the foreign object A only in one direction. Thus, the shearing blade is easily damaged. The extrusion surface 5 of the shearing mechanism 1 is configured to extrude such foreign object and does not cut the foreign object as much as possible. Therefore, the shearing mechanism 1 actively cuts the lawn or the grass, which is the object W, and actively avoids cutting the stone or the metal piece, which is the foreign object A. In particular, when the lawn mower is a robotic self-propelled type, such a mechanism is desirable because a person cannot detect the foreign object A and control the drive of the shearing blade.

3. Function of Shearing Mechanism 1

In Chapter 3, the shearing mechanism 1, the object W to be cut, and the foreign object A to be avoided from being cut described in Chapters 1 and 2 will be described separately for each function.

3.1 About Rotational Motion of Shearing Mechanism 1

Figure 7:
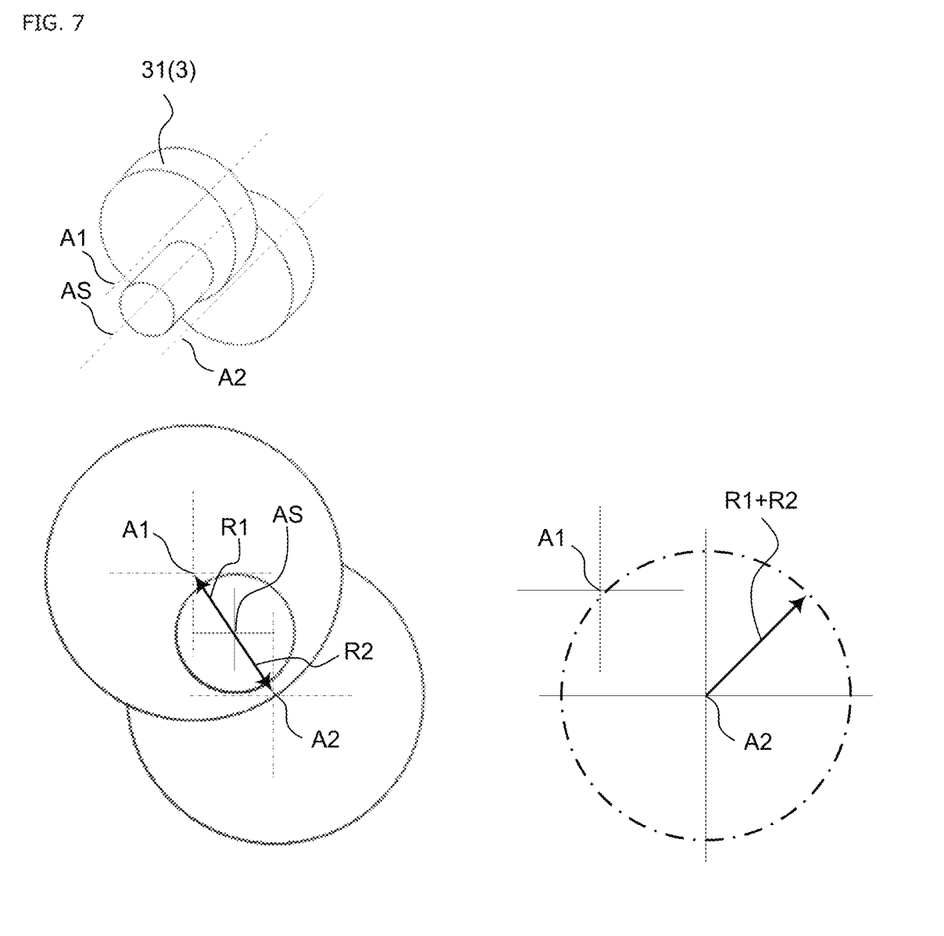
FIG. 7 is a schematic perspective view showing a configuration of an eccentric cam 31 of the shearing mechanism 1.

FIG. 7 is a schematic perspective view showing a configuration of the eccentric cam 31 of the shearing mechanism 1. The motion mechanism 3 of the shearing mechanism 1 moves the first shearing blade 21 and the second shearing blade 22, which are the pair of blade units 2, along the predetermined trajectory. The predetermined trajectory is a circular trajectory, and the motion is a circular motion. Preferably, the motion mechanism 3 is the eccentric cam 31. The eccentric cam 31 has two different rotational axes, wherein one of the pair of blade units 2 is engaged with one of the rotational axes, and other of the pair of blade units 2 is engaged with other of the rotational axes. Specifically, as shown in FIG. 7, the eccentric cam 31 has a motion rotational axis AS that controls an operation of the shearing mechanism 1, a first rotational axis A1 that is engaged with the through hole (the engagement portion 41) of the first shearing blade 21, and a second rotational axis A2 that is engaged with the through hole (the engagement portion 42) of the second shearing blade 22.

The distance from the motion rotational axis AS to the first rotational axis A1 is a first eccentric radius R1, and the distance from the motion rotational axis AS to the second rotational axis A2 is a second eccentric radius R2. When the motion rotational axis AS is rotated by the motor 7 or the like, the first rotational axis A1 and the second rotational axis A2 also rotate around the motion rotational axis AS. By such a rotational motion, the first rotational axis A1 and the second rotational axis A2 perform the rotational motion in coordinate systems of each other. FIG. 7 shows a trajectory of the first rotational axis A1 of the first shearing blade 21 in the coordinate system of the second rotational axis A2. Thus, when the motion rotational axis AS rotates in this way, the first rotational axis A1 rotates with the radius of the first eccentric radius R1 plus the second eccentric radius R2. With such a mechanism, the circular motion can be easily achieved. Further, by using the general-purpose eccentric cam 31, the circular motion can be easily and inexpensively realized.

Since the motion rotational axis AS is bonded to the axis of the motor 7, the rotational motion of the motor 7 is transmitted for rotation. As long as the motor 7 rotates at a constant velocity, the circular motion of the first shearing blade 21 and the second shearing blade 22 configuring the pair of blade units 2 is a constant velocity circular motion. Since the shearing blade moves at the constant velocity in this way, a thought point of zero velocity will not occurred compared to a reciprocating motion such as a clipper. Therefore, the rotational motion can be efficiently converted into a cutting motion.

Figure 8:
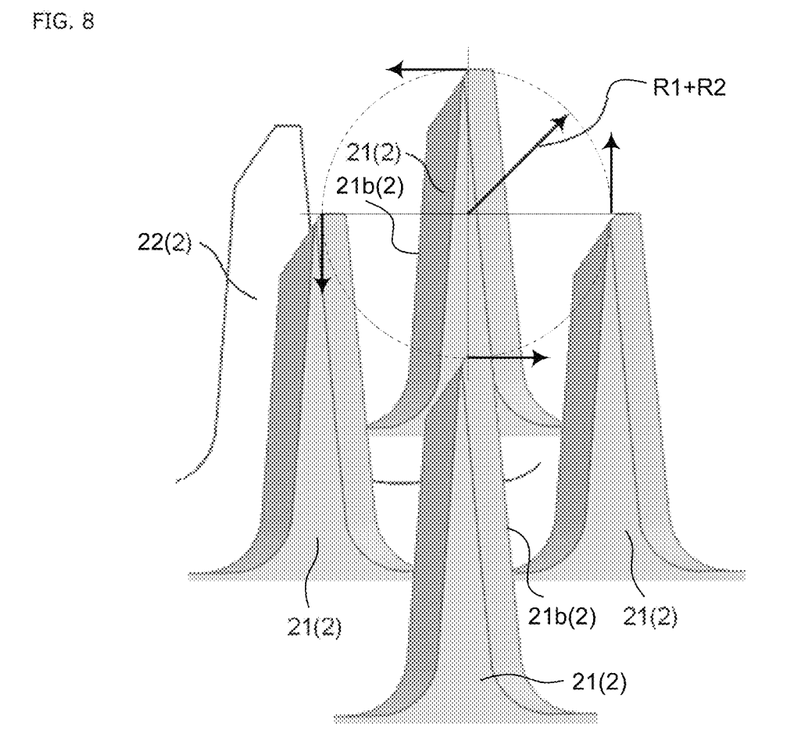
FIG. 8 is a schematic view showing a circular motion of a first shearing blade 21 with respect to a second shearing blade 22.

FIG. 8 is a schematic view showing the circular motion of the first shearing blade 21 with respect to the second shearing blade 22. The circular motion shown in FIG. 8 is configured in such a manner that the pair of blade units 2 cut the object W by periodically overlapping the shearing blades of each other during the motion. In this way, compare to the method of cutting by applying a force from one direction like a clipper, a method of cutting while the second shearing blade 22 moves in the circular motion corresponding to the first shearing blade 21 can cut the object W with a lower load. That is, such low load cutting can be realized because a part of the object W to be cut is not a point of the shearing blade but a line of the shearing blade. For instance, in cooking, rather than applying a force to a knife from top to bottom to cut a material, it is less burdensome to move the knife sideways and apply a force from top to bottom to cut the material. In other words, contact with the shearing blade per unit time increases an area of the object W, thus the cutting can be performed more efficiently.

As shown in FIG. 8, since the first shearing blade 21 performs the circular motion with respect to the second shearing blade 22, both shearing blades are periodically in contact with the object W for cutting. Thus, the load on the shearing blade is small because the load is not applied to a single point of the shearing blade that is continuously in contact with the object W. Accordingly, the occurrence of sliding noise can be reduced. Since such a cutting method applies a force to the object W in vertical and horizontal directions, the user can change the cutting efficiency according to the object W by controlling the rotation velocity of the motor 7, which determines the cutting velocity. Further, amount of cutting of the object W by the shearing blades is determined by the radius of the circular motion of the first shearing blade 21 and the second shearing blade 22. Therefore, the user can freely change the cutting depth by changing the first eccentric radius R1 and the second eccentric radius R2.

Here, although the rotational axes are the first rotational axis A1 and the second rotational axis A2 which determine the first eccentric radius R1 and the second eccentric radius R2, either of the rotational axes can be coaxial with the motion rotational axis AS. By setting the ratio of the first eccentric radius R1 and the second eccentric radius R2 to 1, the distance from the motion rotational axis AS to the first rotational axis A1 and the distance from the motion rotational axis AS to the second rotational axis A2 will be equal, and moments of force will be equal. It is preferable to set the radius ratio to 1 in this way because the load on the part configuring the shearing mechanism 1 is small. However, since a gravity center position differs according to shape and material of the first shearing blade 21 and the second shearing blade 22, the ratio of the first eccentric radius R1 and the second eccentric radius R2 may be changed.

Here, a value of (the first eccentric radius R1/the second eccentric radius R2) or (the second eccentric radius R2/the first eccentric radius R1) is 0 or more and 1 or less. Specifically, the value of (the first eccentric radius R1/the second eccentric radius R2) or (the second eccentric radius R2/the first eccentric radius R1) is 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, or may be in the range between any two of the numerical values illustrated above.

3.2 About Extrusion Mechanism of Extrusion Surface 5

As described above, the shearing blade with respect to at least one of the first shearing blade 21 or the second shearing blade 22 configuring the blade unit 2 comprises the extrusion surface 5 at the end of the shearing blade. The extrusion surface 5 is configured to extrude the foreign object A in contact with the extrusion surface 5 during the motion. That is, a function of the extrusion surface 5 is to prevent the foreign object A from being taken into the recess 21a or the recess 22a of the shearing blades of the blade unit 2 while cutting the object W. With such a function, the first shearing blade 21 and the second shearing blade 22 can prevent the hard foreign object A such as a stone or a metal piece from biting. As a result, damage to the shearing blade is reduced, eventually the burden on the part configuring the shearing mechanism 1 can be reduced.

The extrusion surface 5 is configured to extrude the foreign object A in a state where the first shearing blade 21 and the second shearing blade 22, which are the shearing blades, are not overlapping. Although the extrusion surface 5 of the first shearing blade 21 is described here, the second shearing blade 22 has the same shape as well. As shown in FIG. 5, as long as a shearing blade angle θ1 corresponding to a recess lower end portion 21c of the first shearing blade 21 is close to a right angle to the first shearing blade 21, the foreign object A can easily enter the recess 21a from outside. Thus, the first shearing blade 21 cuts from an end portion 21e of the first shearing blade 21 into an extrusion lower portion 21d to provide an extrusion angle θ2 at the end of the first shearing blade 21. The extrusion angle θ2 is set smaller than the shearing blade angle θ1, and the foreign object A is extruded outward in a state where the first shearing blade 21 and the second shearing blade 22 are not overlapping.

Since the shearing mechanism 1 comprises such an extrusion surface 5, especially the load on the shearing blade can be reduced when the shearing blades are not overlapping. Even when the shearing blades are overlapping, the extrusion surface 5 aims to protect the cutting surfaces of the first shearing blade 21 and the second shearing blade 22 by contacting with the foreign object A.

The extrusion angle θ2 is preferably smaller than the shearing blade angle θ1 and within 90°. That is, an extrusion angle at which the foreign object A is extruded is set corresponding to the rotational direction of the first shearing blade 21. Therefore, a value of (the extrusion angle θ2/the shearing blade angle θ1) is more than 0 and less than 1. Specifically, the value of (the extrusion angle θ2/the shearing blade angle θ1) is 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or may be in the range between any two of the numerical values illustrated above.

The distance from the recess lower end portion 21c to the extrusion lower portion 21d and the distance from the recess lower end portion 21c to the end portion 21e are determined by considering shape, size, or other characteristics of the foreign object A at a place where the shearing mechanism 1 is used, as well as a design value such as shapes of the first shearing blade 21 and the second shearing blade 22 and width of the recess 21a. Therefore, a value of (the distance from the recess lower end portion 21c to the extrusion lower portion 21d/the distance from the recess lower end portion 21c to the end portion 21e) is more than 0 and less than 1. Specifically, the value of (the distance from the recess lower end portion 21c to the extrusion lower portion 21d/the distance from the recess lower end portion 21c to the end portion 21e) is 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or may be in the range between any two of the numerical values illustrated above.

4. Others

The embodiment may be implemented by the following aspects.

(1) The motion mechanism 3 of the shearing mechanism 1 may include a parallel crank mechanism, with one of the pair of blade units 2 engaged with both ends of a fixed link of the parallel crank mechanism, and other of the pair of blade units 2 engaged with both ends of an intermediate link of the parallel crank mechanism. By using the fixed link as the first shearing blade 21 and the intermediate link as the second shearing blade 22, the configuration of the shearing mechanism 1 can be simplified. Further, the motor 7 may be provided to allow the driving link of the parallel crank mechanism rotates.

(2) The engagement portion 4 may include a rolling bearing. By a smoother constant velocity circular motion of the motion rotational axis AS, the first rotational axis A1, and the second rotational axis A2 of the eccentric cam 31, the cutting load of the first shearing blade 21 and the second shearing blade 22 can be reduced.

(3) The blade of the first shearing blade 21 or the second shearing blade 22 may be provided with unevenness like a saw blade. By increasing the cutting area, the object W can be cut more efficiently.

Figure 9:
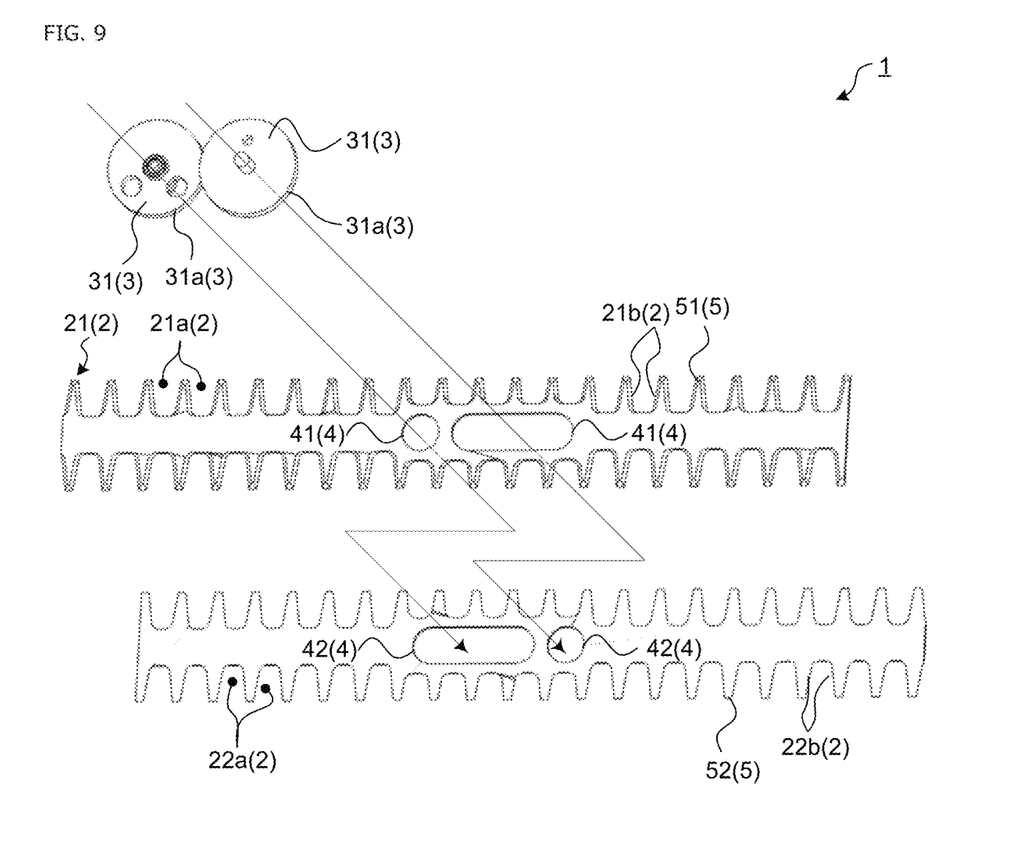
FIG. 9 is a schematic perspective view showing a configuration of the motion mechanism 3 for rotating a plurality of the eccentric cams 31 in opposite directions.
Figure 10:
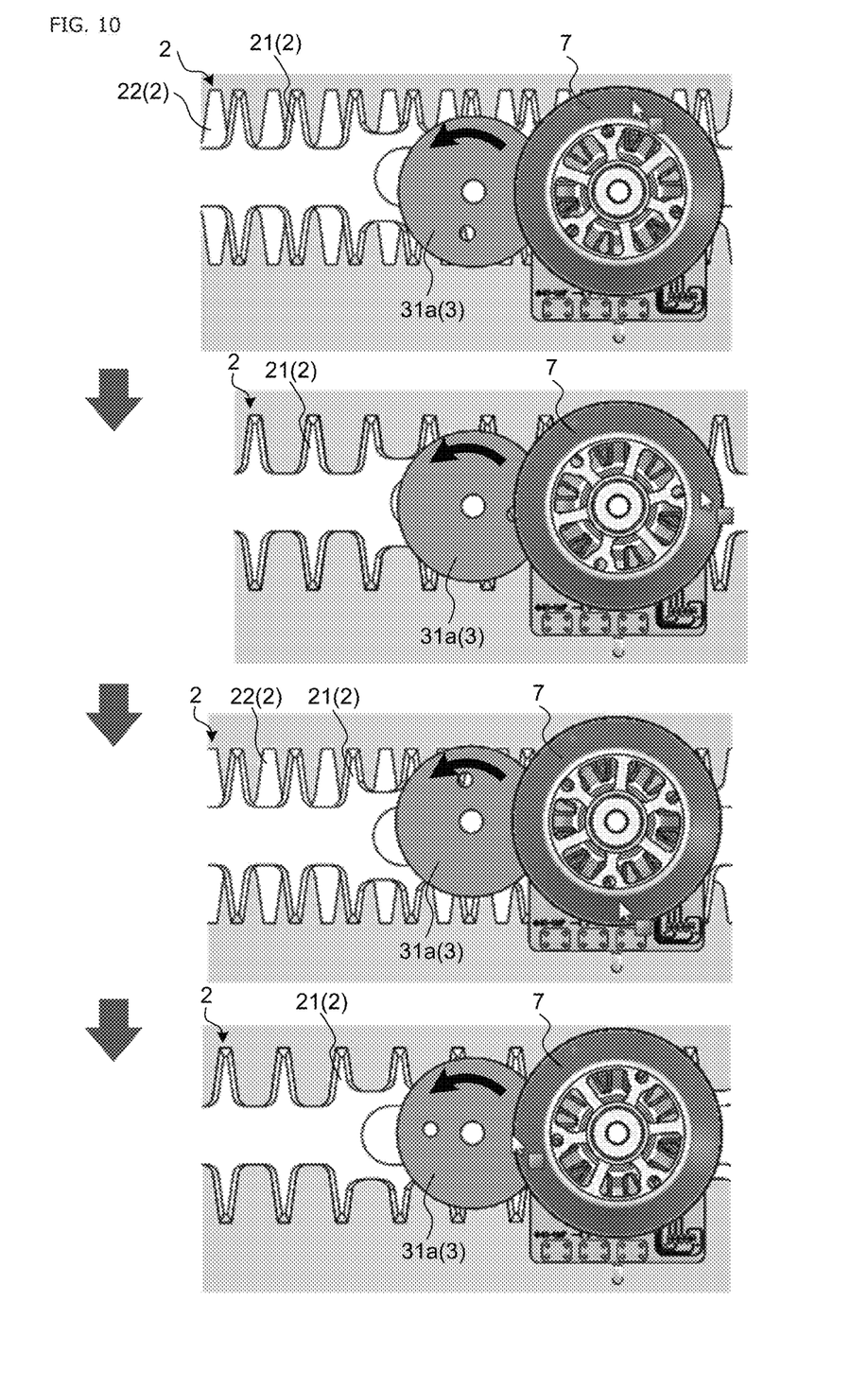
FIG. 10 is a schematic view showing a state in which the blade units 2 are relatively reciprocating while moving up and down.

(4) FIG. 9 is a schematic perspective view showing a configuration of the motion mechanism 3 for rotating the plurality of eccentric cams 31 in opposite directions to each other. The eccentric cam 31 include a gear 31a on a side surface, and both the pair of blade units 2 reciprocally move in the longitudinal direction of the blade unit 2 while maintaining the relative posture to each other by rotating the plurality of eccentric cams 31 in opposite directions to each other. FIG. 10 is a schematic view showing a state in which the blade units 2 are relatively reciprocating while moving up and down. By such a motion mechanism 3, the shearing mechanism 1 has a usefulness that the velocity of the shearing blades does not become zero. In addition, heights of the recess 21a of the first shearing blade 21 and the recess 22a of the second shearing blade 22, that is, the entire length of the blade portion 21b and the blade portion 22b, can be used to cut the lawn or the grass, in such a manner that a blade length (length of the blade portions) can be shortened and the blade units 2 can be made lighter than the case when the eccentric cams 31 rotate in the same direction. Furthermore, since the first shearing blade 21 and the second shearing blade 22 move in a state where longitudinal centers thereof are coincide with each other, the eccentricity of the eccentric cam 31 (amount of movement of the first shearing blade 21 in the left-right direction in FIG. 10) can be changed to match a pitch of the first shearing blade 21 and the second shearing blade 22, which can be used for various types of shearing blades with different blade pitches.

Furthermore, it may be provided in each of the following aspects.

In the shearing mechanism, the predetermined trajectory is a circular trajectory, and the motion is a circular motion.

In the shearing mechanism, the motion mechanism is configured to engage with the pair of blade units via an engagement portion, and one part of the engagement portion relatively performs the circular motion around other part of the engagement portion.

In the shearing mechanism, the circular motion is a constant velocity circular motion, and the pair of blade units are configured to cut the object by periodically overlapping the shearing blades of each other during the motion.

In the shearing mechanism, the motion mechanism has a plurality of eccentric cams, and the eccentric cam has two different rotational axes, one of the pair of blade units is engaged with one of the rotational axes, and other of the pair of blade units is engaged with other of the rotational axes.

In the shearing mechanism, the rotational axis is configured to directly accept a power of the motor.

In the shearing mechanism, the shearing blade with respect to at least one of the blade units comprises an extrusion surface at an end of the shearing blade, and the extrusion surface is configured to extrude a foreign object in contact with the extrusion surface during the motion.

In the shearing mechanism, the extrusion surface is configured to extrude the foreign object when the shearing blades are not overlapping.

Of course, the above embodiments are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. A shearing mechanism, comprising:
    a pair of blade units comprising shearing blades respectively; and
    a motion mechanism configured to move at least one of the pair of blade units along a predetermined trajectory in such a manner that a velocity thereof does not become zero while maintaining a relative posture of the pair of blade units, wherein
    the pair of blade units are configured to cut an object by overlapping the shearing blades of each other during the motion.

2. The shearing mechanism according to claim 1, wherein:
    the predetermined trajectory is a circular trajectory, and the motion is a circular motion.

3. The shearing mechanism according to claim 2, wherein:
    the motion mechanism is configured to engage with the pair of blade units via an engagement portion, and one part of the engagement portion relatively performs the circular motion around other part of the engagement portion.

4. The shearing mechanism according to claim 2, wherein:
    the circular motion is a constant velocity circular motion, and
    the pair of blade units are configured to cut the object by periodically overlapping the shearing blades of each other during the motion.

5. The shearing mechanism according to claim 3, wherein:
    the motion mechanism has a plurality of eccentric cams, and
    the eccentric cam has two different rotational axes, one of the pair of blade units is engaged with one of the rotational axes, and other of the pair of blade units is engaged with other of the rotational axes.

6. The shearing mechanism according to claim 5, wherein:

the rotational axis is configured to directly accept a power of the motor.

7. The shearing mechanism according to claim 1, wherein:
the shearing blade with respect to at least one of the blade units comprises an extrusion surface at an end of the shearing blade, and
the extrusion surface is configured to extrude a foreign object in contact with the extrusion surface during the motion.

8. The shearing mechanism according to claim 7, wherein:
the extrusion surface is configured to extrude the foreign object when the shearing blades are not overlapping.

* * * * *